United States Patent
Li et al.

(10) Patent No.: US 12,020,827 B2
(45) Date of Patent: Jun. 25, 2024

(54) LEAD-COOLED FAST REACTOR UTILIZING CONTROL DRUMS

(71) Applicant: STATE POWER INVESTMENT CORPORATION RESEARCH INSTITUTE, Beijing (CN)

(72) Inventors: Linsen Li, Beijing (CN); Gang Zheng, Beijing (CN); Chunyuan Liu, Beijing (CN); Mian Xing, Beijing (CN); Peidong Sun, Beijing (CN); Yeoh Eing Yee, Beijing (CN); Zhaocan Meng, Beijing (CN); Xiaosong Chen, Beijing (CN); Zhen Luo, Beijing (CN); Yilin Zhang, Beijing (CN); Shuming Zhang, Beijing (CN); Xiaosheng Li, Beijing (CN); Zhihui Li, Beijing (CN); Xiaotao Liao, Beijing (CN); Canhui Sun, Beijing (CN); Yaodong Chen, Beijing (CN); Yuquan Li, Beijing (CN)

(73) Assignee: STATE POWER INVESTMENT CORPORATION RESEARCH INSTITUTE, Beijing (CN)

( * ) Notice: Subject to any disclaimer, the term of this patent is extended or adjusted under 35 U.S.C. 154(b) by 0 days.

(21) Appl. No.: 17/567,013

(22) Filed: Dec. 31, 2021

(65) Prior Publication Data
US 2022/0319723 A1    Oct. 6, 2022

(51) Int. Cl.
*G21C 1/32*  (2006.01)
*G21C 1/03*  (2006.01)
*G21C 15/247*  (2006.01)

(52) U.S. Cl.
CPC ............... *G21C 1/322* (2013.01); *G21C 1/03* (2013.01); *G21C 15/247* (2013.01)

(58) Field of Classification Search
CPC . G21C 1/02; G21C 1/03; G21C 1/322; G21C 15/02; G21C 15/04; G21C 15/247; G21C 19/28
(Continued)

(56) References Cited

U.S. PATENT DOCUMENTS 3,305,450 A * 2/1967 Edmond ................ G21C 1/326
                                                    976/DIG. 10
4,478,784 A * 10/1984 Burelbach ................ G21C 1/03
                                                    165/274

(Continued)

FOREIGN PATENT DOCUMENTS

CN    205984290 U    2/2017
CN    207250153 U    4/2018
(Continued)

OTHER PUBLICATIONS

China Patent Application No. 202011391520.1; Office Action; dated Jan. 16, 2024; 14 pages.

*Primary Examiner* — Jack W Keith
*Assistant Examiner* — Jinney Kil
(74) *Attorney, Agent, or Firm* — BakerHostetler

(57) ABSTRACT

A nuclear reactor includes a reactor container, a reactor core, a control drum assembly, a hot channel, a heat exchanger and a main pump. The reactor container contains a coolant; the reactor core is arranged at a lower middle part of the reactor container; the control drum assembly is arranged on an outer periphery of the reactor core, and includes control drums arranged at intervals along a peripheral direction of the reactor core; the hot channel is arranged in the reactor container and located above the reactor core. The hot channel has a bottom hermetically connected to the control drum assembly and a top hermetically connected to an inner top surface of the reactor container. The hot channel has a hot pool passage for the coolant to pass through. The heat (Continued)

exchanger is arranged in the reactor container and located on an outer periphery of the hot channel.

10 Claims, 4 Drawing Sheets

(58) Field of Classification Search
USPC .................. 376/361, 402, 404, 405, 406
See application file for complete search history.

(56) References Cited

U.S. PATENT DOCUMENTS

| | | | | |
|---|---|---|---|---|
| 4,657,071 A | * | 4/1987 | Arene | G21C 1/03 |
| | | | | 376/405 |
| 4,681,726 A | * | 7/1987 | Sakurai | G21C 5/10 |
| | | | | 376/302 |
| 5,676,520 A | * | 10/1997 | Thut | F04D 7/065 |
| | | | | 266/239 |
| 2015/0036779 A1 | * | 2/2015 | Leblanc | G21D 3/00 |
| | | | | 376/207 |
| 2016/0049210 A1 | * | 2/2016 | Filippone | F22B 1/063 |
| | | | | 376/406 |
| 2016/0180975 A1 | * | 6/2016 | Morrill | G21C 1/086 |
| | | | | 376/362 |
| 2019/0189296 A1 | * | 6/2019 | Cinotti | G21C 3/33 |
| 2022/0005619 A1 | * | 1/2022 | Cisneros, Jr. | G21C 5/02 |

FOREIGN PATENT DOCUMENTS

| | | |
|---|---|---|
| CN | 108520786 A | 9/2018 |
| CN | 108550407 A | 9/2018 |
| CN | 109416946 A | 3/2019 |
| CN | 109887623 A | 6/2019 |
| CN | 110299214 A * | 10/2019 |
| FR | 2370344 A2 * | 6/1978 |
| JP | 2001-188093 A | 7/2001 |

* cited by examiner

LEAD-COOLED FAST REACTOR UTILIZING CONTROL DRUMS

CROSS-REFERENCE TO RELATED APPLICATIONS

The present disclosure is based on and claims priority to Chinese Application No. 202011391520.1, filed on Dec. 1, 2020, the entire contents of which are incorporated herein by reference.

FIELD

The present disclosure relates to a field of lead-cooled fast reactors and, in particular, to a nuclear reactor.

BACKGROUND

Lead-cooled fast reactors refer to fast neutron reactors cooled by liquid lead or lead-bismuth alloy. Since the lead-cooled fast reactors can well meet target requirements for safety, sustainability and nuclear non-proliferation of fourth-generation reactors, many countries are currently actively conducting researches on lead-cooled fast reactors.

In the related art, reactor cores implement nuclear reaction control by inserting a control rod, and the control rod is inserted from a top of the reactor core; additionally, a main pump and a heat exchanger of the lead-cooled fast reactor are arranged on an outer periphery of the reactor core. The layout scheme of the above-mentioned lead-cooled fast reactors have the following problems.

1) Since the main pump and the heat exchanger are located on the outer periphery of the reactor core, a local radial dimension of the lead-cooled fast reactor is relatively large, which in turn results in a large overall dimension of the lead-cooled fast reactor and a large total amount of coolant (liquid lead or lead-bismuth alloy) in the lead-cooled fast reactor.

2) The main pump adopts a long-shaft pump which is less reliable. In order to ensure a driving effect, it is necessary to provide a plurality of main pumps, which raises the structural complexity of the lead-cooled fast reactor and further increases the volume of the lead-cooled fast reactor.

3) If a heat exchange tube for steam flow in the heat exchanger is damaged, steam can easily flow to the reactor core along with the coolant, which easily results in problems concerning the criticality of the reactor core and is thus not conducive to the safe and stable operation of the reactor core. Moreover, the pressure intensity of the steam in the heat exchange tube is relatively high, such that leaked steam will cause flash evaporation or flash explosion, which can easily cause impact on surrounding components at a leaking position and is thus not conducive to the stable operation of the lead-cooled fast reactor.

SUMMARY

A nuclear reactor according to an embodiment of the present disclosure includes a reactor container including a barrel body and a cover body, an opening being formed at a top of the barrel body, the cover body sealing the opening of the barrel body, and the reactor container containing a coolant; a reactor core arranged at a lower middle part inside the reactor container; a control drum assembly arranged on an outer periphery of the reactor core, the control drum assembly including a plurality of control drums, each of the control drums being rotatable around its center, and the plurality of control drums being arranged at intervals along a peripheral direction of the reactor core; a hot channel arranged in the reactor container and located above the reactor core, the hot channel having a bottom hermetically connected to the control drum assembly and a top hermetically connected to an inner top surface of the reactor container, the hot channel having a hot pool passage for the coolant to pass through, and the top of the hot channel being hermetically connected to the cover body; a heat exchanger arranged in the reactor container and located on an outer periphery of the hot channel, an inlet of the heat exchanger being in communication with the hot pool passage, and a top of the heat exchanger being fixedly connected to the cover body; and a main pump fixed on the cover body and having a part arranged in the hot pool passage, the main pump pumping the coolant in the hot pool passage into the heat exchanger.

DETAILED DESCRIPTION OF EMBODIMENTS

Figure 1:
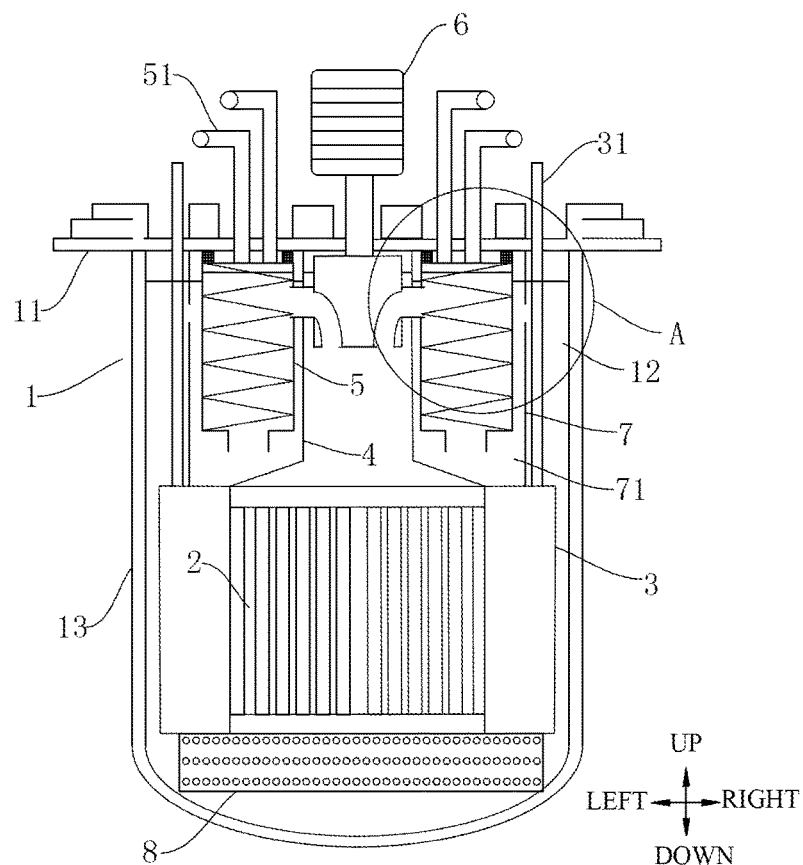
FIG. 1 is a schematic diagram of an overall structure of a nuclear reactor according to an embodiment of the present disclosure.

Embodiments of the present disclosure will be described in detail below, and examples of the embodiments are illustrated in the accompanying drawings. The embodiments described below with reference to the accompanying drawings are exemplary, and are intended to explain the present disclosure rather than limit the present disclosure.

As shown in FIGS. 1 to 5, a nuclear reactor according to an embodiment of the present disclosure includes a reactor container 1, a reactor core 2, a control drum assembly 3, a hot channel 4 (also called a coolant channel), a heat exchanger 5, and a main pump 6.

The reactor container 1 includes a barrel body 13 and a cover body 11, an opening is formed in a top of the barrel body 13, and the cover body 11 is used to seal the opening of the barrel body 13. The reactor container 1 contains a coolant for cooling the reactor core 2.

Figure 3:
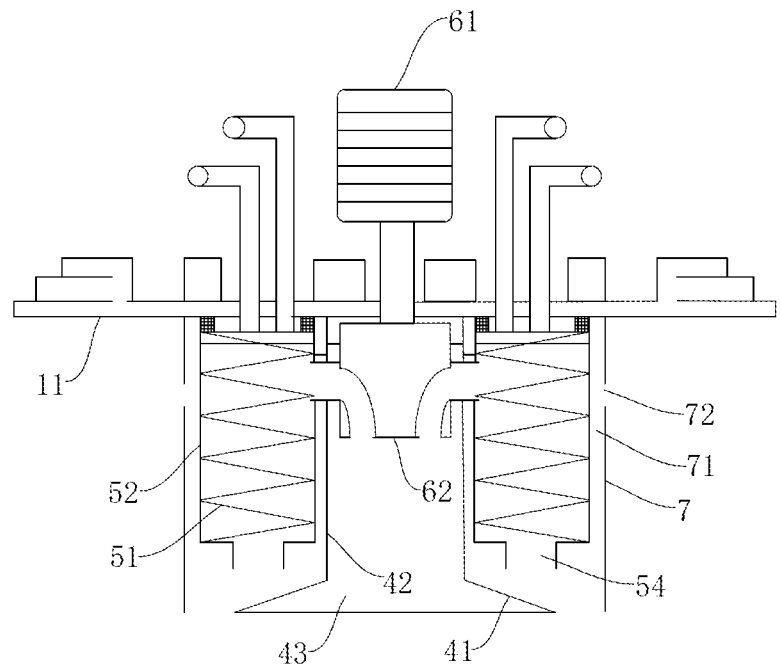
FIG. 3 is a schematic diagram of a top structure of the nuclear reactor in FIG. 1.

Specifically, as shown in FIGS. 1 and 3, the reactor container 1 in this embodiment extends along a first direction (an up-down direction in FIG. 1). The reactor container 1 includes the barrel body 13 and the cover body 11, the opening of the barrel body 13 faces upward, and the cover body 11 is fixed on the top of the barrel body 13. The design of the barrel body 13 and the cover body 11 facilitates installation of various components in the reactor container 1 and sealing of the reactor container 1. Moreover, the cover body 11 can be fixedly connected to a preset member, enabling suspension installation of the nuclear reactor, avoiding the need for positioning and calibration by sensors in a process of supporting and installing a bottom of the nuclear reactor in the related art, simplifying the installation process and improving the installation efficiency. In this embodiment, the preset member may be a mounting frame provided with a through hole for the nuclear reactor to pass through, and the cover body 11 can stop against a peripheral side of the through hole in the mounting frame.

The reactor core 2 is arranged at a lower middle part inside the reactor container 1. Specifically, the reactor core 2 is arranged within the reactor container 1 and located at the lower middle part inside the reactor container 1, and the reactor core 2 is used to generate a nuclear reaction.

The control drum assembly 3 is arranged on an outer periphery of the reactor core 2, and includes a plurality of control drums 32, each of which can rotate around its respective center. The plurality of control drums 32 are arranged at intervals along the peripheral direction of the reactor core 2. Specifically, a neutron absorber is provided on a part of an outer peripheral surface of each control drum 32 to absorb a large amount of neutrons, without forming any radioactive isotope. When a nuclear reaction of the reactor core 2 needs to be controlled, the control drums 32 are rotated and the neutron absorber on the control drums 32 faces the reactor core 2, such that the nuclear reaction of the reactor core 2 is controlled through the absorption of neutrons by the neutron absorber. In this embodiment, the plurality of control drums 32 are arranged on the outer periphery of the reactor core 2, and the nuclear reaction rate of the reactor core 2 can be controlled according to levels by rotating different numbers of control drums 32.

The hot channel 4 is arranged in the reactor container 1 and located above the reactor core 2, and the hot channel 4 has a bottom hermetically connected to the control drum assembly 3 and a top hermetically connected to an inner top surface of the reactor container 1. The hot channel 4 has a hot pool passage 43 (also called a first coolant passage) therein for the coolant to pass through, and the top of the hot channel 4 is hermetically connected to the cover body 11. Specifically, in this embodiment, the hot channel 4 is arranged above the reactor core 2; the bottom of the hot channel 4 is hermetically connected to the control drum assembly 3; a bottom orifice of the hot channel 4 is located on an outer peripheral side of the reactor core 2; and the top of the hot channel 4 is hermetically connected to the cover body 11. The hermetical connection of top and bottom ends of the hot channel 4 prevents the coolant from flowing out at joints of the top and bottom ends of the hot channel 4. The hot channel 4 is arranged so that the coolant flowing out from the reactor core 2 directly flows into the hot channel 4, and the hot pool passage 43 inside the hot channel 4 is a channel for the hot coolant to circulate.

The heat exchanger 5 is arranged in the reactor container 1 and located on an outer periphery of the hot channel 4, an inlet of the heat exchanger 5 is in communication with the hot pool passage 43, and a top of the heat exchanger 5 is fixedly connected to the cover body 11. Specifically, in this embodiment, the heat exchanger 5 is arranged in the reactor container 1, and the heat exchanger 5 is located above the reactor core 2 and on the outer periphery of the hot channel 4. The heat exchanger 5 includes a heat exchange container 52 and a heat exchange tube 51, a part of the heat exchange tube 51 is located in the heat exchange container 52, and two ends of the heat exchange tube 51 hermetically pass out from the heat exchange container 52. In this embodiment, the inlet of the heat exchanger 5 refers to a container inlet 53 in the heat exchange container 52, the container inlet 53 is in communication with the hot pool passage 43, and the coolant in the hot pool passage 43 can directly flow into the heat exchange container 52. It should be noted that an outlet of the heat exchanger 5 in this embodiment refers to a container outlet 54 formed in the heat exchange container 52, and the container outlet 54 allows the coolant to flow out from the heat exchange container 52. In this embodiment, a top of the heat exchange container 52 is fixedly connected to the cover body 11, realizing the integrated arrangement of the heat exchanger 5 and the cover body 11.

In this embodiment, a connecting tube is arranged between the hot channel 4 and the heat exchange container 52, and the connecting tube has a first end in communication with the hot pool passage 43 inside the hot channel 4 and a second end in communication with an inner cavity of the heat exchange container 52; and the coolant in the hot pool passage 43 flows into the heat exchange container 52 via the connecting tube. It can be understood that in some other embodiments, the heat exchange container 52 and the hot channel 4 are integrally arranged, that is, a tube wall of the heat channel 4 may be regarded as part of a container wall of the heat exchange container 52. At this time, the hot pool passage 43 is in communication with the inner cavity of the heat exchange container 52 through a through hole formed in the tube wall of the hot channel 4 (i.e., the container wall of the heat exchange container 52).

The main pump 6 is fixed on the cover body 11, a part of the main pump 6 is arranged in the hot pool passage 43, and the main pump 6 is used to pump the coolant in the hot pool passage 43 into the heat exchanger 5. Specifically, the main pump 6 in this embodiment includes a motor 61 and an impeller 62 arranged on an output shaft of the motor 61, and the impeller 62 is driven by the motor 61 to rotate. In this embodiment, the impeller 62 is arranged in the hot pool passage 43, and the rotating impeller 62 will transfer the coolant in the hot pool passage 43 outwards, driving the coolant in the hot pool passage 43 to flow into the heat exchanger 5. In this embodiment, the motor 61 of the main pump 6 is fixedly connected to the cover body 11, and an output shaft of the motor 61 passes through the cover body 11. The fixed connection between the main pump 6 and the cover body 11 realizes the integrated arrangement of the main pump 6 and the cover body 11, and further realizes the integrated arrangement of the heat exchanger 5 and the main pump 6.

According to the nuclear reactor in this embodiment of the present disclosure, the hot channel 4 and the heat exchanger 5 are arranged above the reactor core 2; the heat exchanger 5 is arranged on the outer periphery of the hot channel 4; and the control drum assembly 3 is arranged on the outer periphery of the reactor core 2. This structural arrangement makes diameters of the reactor core 2 and the control drum assembly 3 equal to diameters of the hot channel 4 and the heat exchanger 5, such that a horizontal radial dimension of the overall structure in the reactor container 1 is constant in the up-down direction, preventing the horizontal radial dimension of the reactor container 1 from being locally too large (radial dimensions at the main pump 6 and the heat exchanger 5) when the main pump 6 and the heat exchanger 5 are arranged in a staggered manner in the related art (the main pump 6 is arranged on an outer periphery of the heat exchanger 5), and facilitating reduction in the horizontal radial dimension of the reactor container 1.

Since the main pump 6 and the heat exchanger 5 are both fixed on the cover body, the main pump 6, the heat exchanger 5, and the cover body 11 are assembled as a whole, which realizes the high integration of the main pump 6 and the heat exchanger 5. When the cover body 11 is installed on the barrel body 13, the main pump 6 and the heat exchanger 5 can be installed in place by themselves, facilitating the assembly and disassembly of the main pump 6 and the heat exchanger 5.

Moreover, since the nuclear reaction of the reactor core 2 is regulated and controlled by the control drums 32, in which the regulation and control is realized by rotating the control drums 32, the need to reserve a space for axial movement of the control rod when the control rod is inserted to perform control in the related art is eliminated, greatly reducing an overall length dimension of the nuclear reactor (i.e., a height dimension of the nuclear reactor in this embodiment), and improving the compactness of the nuclear reactor.

In addition, since the hot channel 4 is arranged above the reactor core 2, the main pump 6 adopts a shorter output shaft (i.e., a short shaft pump) to extend into the hot pool passage 43 of the hot channel 4, which simplifies the arrangement form of the main pump 6 and improves the reliability of the main pump 6.

The nuclear reactor in this embodiment of the present disclosure has a compact structure and a small volume; the total amount of the coolant is relatively small; the internal structure is optimized, the manufacturing cost of the nuclear reactor is reduced, and the economical efficiency of the nuclear reactor is improved; and the nuclear reactor can be moved and carried conveniently, such that the nuclear reactor can be installed in a narrow space.

Figure 2:
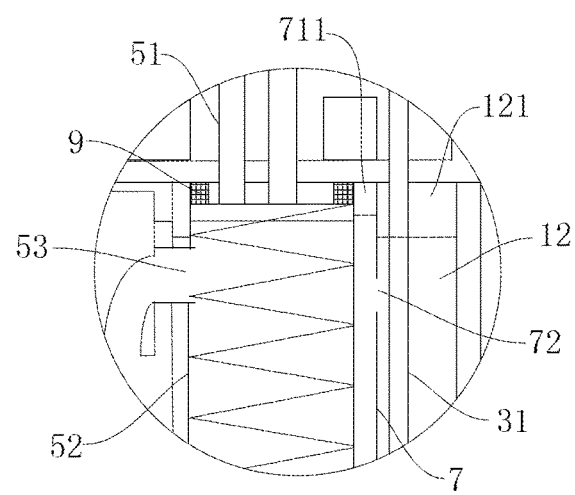
FIG. 2 is an enlarged schematic diagram at part A in FIG. 1.

In some embodiments, as shown in FIGS. 1 to 3, the nuclear reactor further includes a sealing sleeve 7 arranged in the reactor container 1. The sealing sleeve 7 and the reactor container 1 are spaced apart from each other in an inner-outer direction of the reactor container 1 to form a cold pool passage 12 (also called a second coolant passage). The sealing sleeve 7 has a bottom hermetically connected to the control drum assembly 3 and a top hermetically connected to the inner top surface of the reactor container. The sealing sleeve 7 is fitted over the outer periphery of the hot channel 4 and is spaced apart from the hot channel 4 in the inner-outer direction of the reactor container 1 to form an annular cavity 71. The annular cavity 71 has a first gas space 711 at its top, the first gas space 711 is filled with inert gas, and the heat exchanger 5 is arranged in the annular cavity 71. A through hole 72 is formed in the top of the sealing sleeve 7 and located below the first gas space 711, and the through hole 72 is in communication with the annular cavity 71 and the cold pool passage 12. The outlet of the heat exchanger 5 is formed in a bottom of the heat exchanger 5.

Specifically, in this embodiment, the sealing sleeve 7 is arranged in the reactor container 1 and above the reactor core 2 and is located on the outer periphery of the hot channel 4. A bottom end of the sealing sleeve 7 is hermetically connected to a top of the control drum assembly 3, and a top end of the sealing sleeve 7 is hermetically connected to an inner top wall of the reactor container 1. The sealed annular cavity 71 is formed between the sealing sleeve 7 and the hot channel 4, and the heat exchanger 5 is arranged in the annular cavity 71. The cold pool passage 12 is formed between the sealing sleeve 7 and the reactor container 1, and the cold pool passage 12 is used for the coolant to circulate. In this embodiment, the container outlet 54 (the outlet of the heat exchanger 5) is formed at a bottom of the heat exchange container 52, and the coolant flowing out from the container outlet 54 will directly flow into the annular cavity 71. The through hole 72 is formed in the sealing sleeve 7 and used to communicate the annular cavity 71 with the cold pool passage 12, and the coolant in the annular cavity 71 can flow into the cold pool passage 12 through the through hole 72.

In this embodiment, the annular cavity 71 has the first gas space 711 at the top thereof, and the first gas space 711 is filled with inert gas. In this embodiment, the through hole 72 in the sealing sleeve 7 is located at the top of the sealing sleeve 7 and located below the first gas space 711, and the container outlet 54 is located below the through hole 72. The coolant flowing out from the container outlet 54 will flow upward and finally flow into the cold pool passage 12 from the through hole 72.

In this embodiment, a heat exchange medium, which is usually steam, is introduced into the heat exchange tube 51 of the heat exchanger 5. The heat exchange medium can exchange heat with the coolant flowing into the heat exchange container 52, thereby cooling the coolant. It should be noted that in this embodiment, since the container outlet 54 is located at the bottom of the heat exchange container 52 and the through hole 72 is located at the top of the sealing sleeve 7, a special flow channel for the coolant to flow from bottom to top is formed in the sealing sleeve 7. During the operation of the nuclear reactor, if the heat exchange tube 51 of the heat exchanger 5 ruptures, the heat exchange medium will be mixed into the coolant, and the coolant will flow upward along the special flow channel in the sealing sleeve 7. During the upward flow, the heat exchange medium separates itself from the coolant and converges in the first gas space 711 of the annular cavity 71, which has an effect of separating the heat exchange medium mixed into the coolant, avoiding the problem concerning the criticality of the reactor core 2 caused by the heat exchange medium flowing into the reactor core 2, and improving the operational safety of the nuclear reactor.

Moreover, since the pressure intensity of the heat exchange medium is usually greater than that of the coolant, when the heat exchange tube 51 is damaged, the leaked heat exchange medium may undergo flash evaporation or flash explosion. In such a case, the first gas space 711 is arranged to relieve pressure, reducing the impact of pressure generated by the flash vaporization or flash explosion, further improving the operational safety of the nuclear reactor.

In addition, since the through hole 72 is arranged at a position close to the first gas space 711, that is, a position close to a free surface of the coolant, a situation where the coolant at the top of the cold pool passage 12 stagnates (not flow), which is easily caused by the arrangement of the through hole 72 at the bottom of the sealing sleeve 7, can be avoided, avoiding the occurrence of thermal stratification in the cold pool passage 12 due to the stagnation, and further avoiding thermal fatigue and shortened service life of components easily caused by the thermal stratification.

In some embodiments, as shown in FIG. 2, the cold pool passage 12 has a second gas space 121 at the top thereof, and the second gas space 121 is filled with inert gas. Specifically, the second gas space 121 also has functions of converging the heat exchange medium and buffering the pressure impact generated by flash vaporization or flash explosion, and thus further improves the safety of the nuclear reactor in use.

In some embodiments, as shown in FIG. 3, there are a plurality of through holes 72 arranged at intervals along a peripheral direction of the sealing sleeve 7. Specifically, the sealing sleeve 7 is provided with a plurality of through holes 72, through which the annular cavity 71 can be in communication with the cold pool passage 12, such that the coolant in the annular cavity 71 can flow into the cold pool passage 12 from various directions, avoiding a large difference in the liquid level of the coolant in the cold pool passage 12, and allowing the coolant to be evenly distributed into the cold pool passage 12, which is conductive to the stability of the nuclear reactor structure.

In some embodiments, as shown in FIG. 1, the nuclear reactor further includes a guide plate 8 arranged below the reactor core 2 and used to guide the coolant in the cold pool passage 12 to flow into the reactor core 2. Specifically, the guide plate 8 is arranged below the reactor core 2 and provided with guide holes. The coolant in the cold pool passage 12 can flow into the reactor core 2 via the guide holes, and hence the coolant can be uniformly distributed into the reactor core 2.

In some embodiments, as shown in FIG. 3, the hot channel 4 includes a tapered segment 41 and a cylindrical segment 42; a cross-sectional area of the tapered segment 41 gradually increases from top to bottom; the tapered segment 41 has a lower end hermetically connected to the control drum assembly 3 and an upper end connected to the cylindrical segment 42; and a cross-sectional area of the cylindrical segment 42 is constant from top to bottom. Specifically, the design of the tapered segment 41 and the cylindrical segment 42 makes an inlet dimension of the hot channel 4 adaptive to an outlet dimension of the reactor core 2, and moreover a Venturi effect can be formed between the tapered segment 41 and the cylindrical segment 42, that is, the coolant in the cylindrical segment 42 has a relatively large flow rate, which has an effect of increasing the flow rate, shortens the circulation cycle of the coolant, and further enhances heat dissipation of the reactor core 2. In addition, the design of the cylindrical segment 42 can reduce a horizontal radial dimension of an upper part of the nuclear reactor, which is conducive to a miniaturized structural design of the nuclear reactor.

In some embodiments, as shown in FIG. 1 and FIG. 2, the control drum assembly 3 further includes a plurality of connecting rods 31. The plurality of connecting rods 31 are connected to the control drums 32 in one-to-one correspondence and all pass through the reactor container 1. The connecting rods 31 are used to drive the control drums 32 to rotate to control the nuclear reaction of the reactor core 2. Specifically, since the control drum assembly 3 is located at the bottom of the reactor container 1, the connecting rods 31 can drive the control drums 32 of the control drum assembly 3 to rotate from the outside of the reactor container 1 conveniently, facilitating control over the nuclear reaction inside the reactor core 2.

Figure 5:
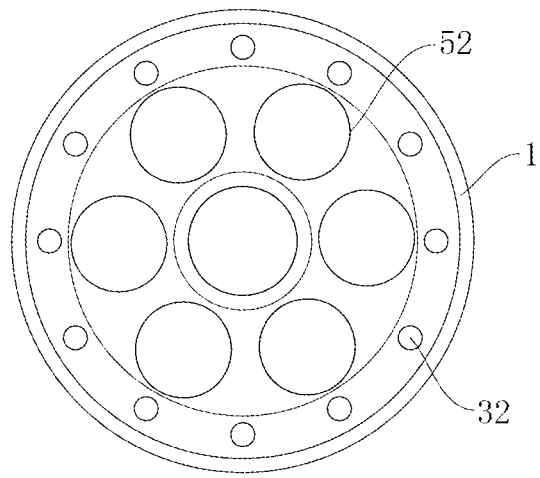
FIG. 5 is a schematic diagram of a horizontal section of the nuclear reactor in FIG. 1.

In some embodiments, as shown in FIG. 1 and FIG. 5, there are a plurality of heat exchangers 5 arranged at intervals along the peripheral direction of the hot channel 4, and an inlet of each of the plurality of heat exchangers 5 is in communication with the hot pool passage 43. Specifically, in a situation where a plurality of heat exchangers 5 are provided, when an individual heat exchanger 5 is damaged during use, the remaining heat exchangers 5 can still function to cool the coolant, ensuring the stable operation of the nuclear reactor.

Figure 6:
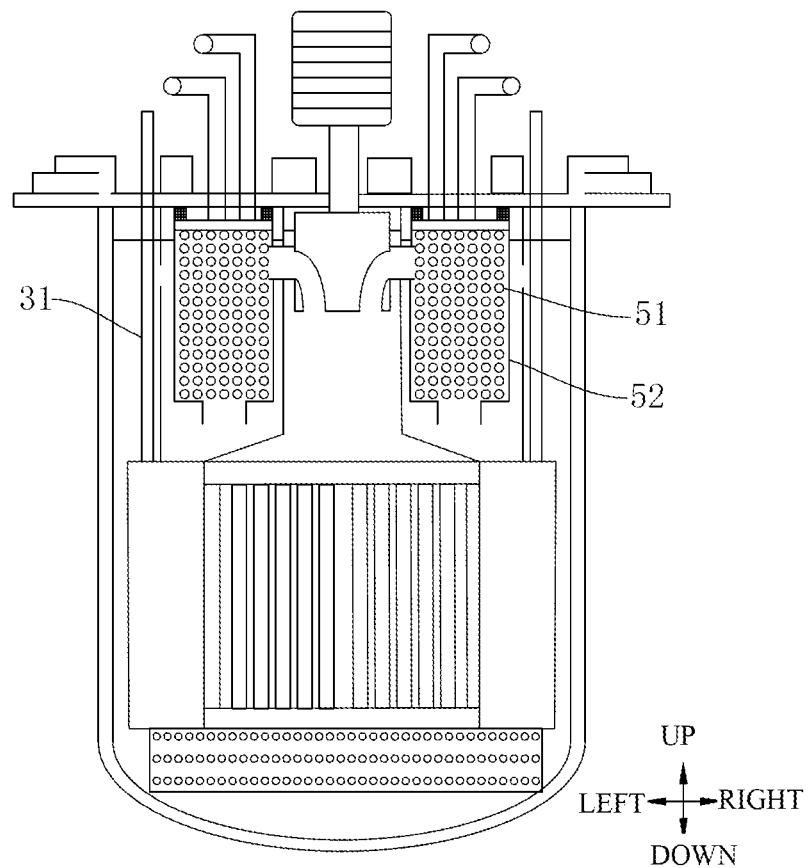
FIG. 6 is a schematic diagram of an overall structure of a nuclear reactor according to another embodiment of the present disclosure.
Figure 7:
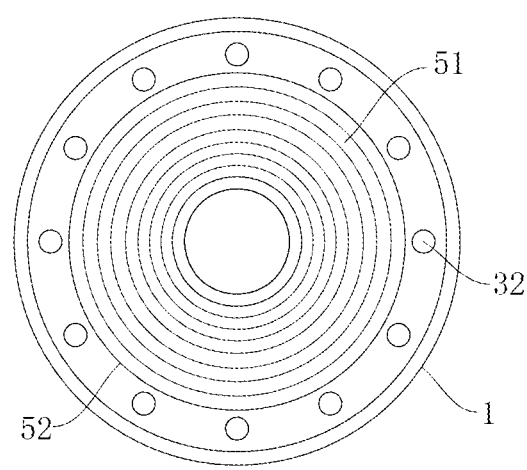
FIG. 7 is a schematic diagram of a horizontal section of the nuclear reactor in FIG. 6.

In some embodiments, as shown in FIG. 6 and FIG. 7, the heat exchanger 5 includes a heat exchange container 52 and a heat exchange tube 51, and at least part of the heat exchange tube 51 is arranged in the heat exchange container 52. The heat exchange container 52 is annular and is arranged on the outer periphery of the hot channel 4. The heat exchange tube 51 located in the heat exchange container 52 is coiled around the outer periphery of the hot channel 4. Specifically, the overall structure of the heat exchanger 5 is simplified due to the annular shape of the heat exchange container 52 and the coiled design of the heat exchange tube 51, which facilitates the installation of the heat exchanger 5, and makes the nuclear reactor more economical.

In some embodiments, a flow direction of the coolant in the heat exchanger 5 is opposite to a flow direction of the heat exchange medium in the heat exchange tube 51, that is, the coolant is cooled in the heat exchanger 5 by means of reverse heat exchange, which improves the thermal efficiency.

In some embodiments, as shown in FIG. 2, the nuclear reactor further includes a connector 9 arranged in the reactor container and located between the heat exchanger 5 and the cover body 11. The connector 9 has a first end fixedly connected to the heat exchanger 5 and a second end fixedly connected to the cover body 11, such that the heat exchanger 5 and the cover body 11 are connected as a whole. Specifically, due to the arrangement of the connector 9, it is unnecessary to consider the influence of welding on deformation of the heat exchange container 52 and deformation of the cover body 11 when the heat exchange container 52 of the heat exchanger 5 is directly connected to the cover body 11 by welding, thereby facilitating welding connection.

In some embodiments, there are a plurality of heat exchangers 5, and the connector 9 is shaped as a circular ring. The plurality of heat exchangers 5 are fixed to a bottom of the connector 9 and arranged at intervals along the peripheral direction of the connector 9, and a top of the connector 9 is fixedly connected to the cover body 11. This design facilitates the installation and positioning of the heat exchangers 5. During installation, the plurality of heat exchangers 5 are first fixed to the connector 9; and finally, the connector 9 is fixedly connected to the cover body 11 directly, realizing the integration of installation of the plurality of heat exchangers 5.

In some embodiments, the heat exchanger 5 includes a heat exchange container 52 and a heat exchange tube 51, and at least part of the heat exchange tube 51 is arranged in the heat exchange container 52. The heat exchange container 52 is annular and arranged on the outer periphery of the hot channel 4, and the heat exchange tube 51 located in the heat exchange container 52 is coiled around the outer periphery of the hot channel 4. There are a plurality of connectors 9 arranged on the top of the heat exchanger 5 and at intervals along the peripheral direction of the heat exchanger 5. Specifically, there is one heat exchanger 5 in this embodiment, and the heat exchanger 5 is annular overall. The plurality of connectors 9 are arranged between a top surface of the heat exchanger 5 and the cover body 11, and are also arranged at intervals along the peripheral direction of the heat exchanger 5. With such a design, the connectors 9 do not require high machining accuracy, which avoids poor installation precision and easy tilting of the heat exchanger 5 easily caused by low machining precision of the connector 9 when only one integral connector 9 is arranged between the heat exchanger 5 and the cover body 11 (for example, the connector 9 is in a shape of a circular ring), and ensures the installation quality of the heat exchanger 5.

The nuclear reactor according to a specific example of the present disclosure will be described below with reference to FIG. 1 to FIG. 5.

As shown in FIG. 1, the nuclear reactor according to an embodiment of the present disclosure includes a reactor container 1, a reactor core 2, a control drum assembly 3, a hot channel 4, a heat exchanger 5, a sealing sleeve 7, a guide plate 8 and a main pump 6.

In this embodiment, the reactor container 1 includes a barrel body 13 and a cover body 11, an opening is formed at a top of the barrel body 13, and the cover body 11 is fixed at the top opening of the barrel body 13. Specifically, in this embodiment, the barrel body 13 is in a shape of a circular barrel, and extends in an up-down direction. The cover body 11 is fixed at the top of the barrel body 13 by bolts or welding. In this embodiment, the reactor container 1 is filled with a coolant, which is cooling lead. In other embodiments, the coolant may also be cooling lead-bismuth.

In this embodiment, the reactor core 2 is arranged inside the reactor container 1 and located at a lower middle part of the reactor container 1, and the reactor core 2 is used to generate a nuclear reaction. A guide plate 8 is also arranged inside the reactor container 1 and below the reactor core 2, and is provided with guide holes. The guide plate 8 functions to even out the flow distribution to the reactor core 2.

In this embodiment, the control drum assembly 3 is also arranged on an outer periphery of the reactor core 2, and includes a plurality of control drums 32, each of which is rotatable around its center. As shown in FIG. 5, the plurality of control drums 32 are arranged at intervals along a peripheral direction of the reactor core 2. In this embodiment, a neutron absorber is provided on a part of an outer peripheral surface of each control drum 32 to absorb a large amount of neutrons, without forming any radioactive isotope. When the nuclear reaction of the reactor core 2 needs to be controlled, the control drums 32 are rotated and the neutron absorber on the control drums 32 faces the reactor core 2, such that the nuclear reaction of the reactor core 2 is controlled by the absorption of neutrons by the neutron absorber. Since the plurality of control drums 32 are arranged on the outer periphery of the reactor core 2, a nuclear reaction rate of the reactor core 2 can be controlled according to levels by rotating different numbers of control drums 32, such that the nuclear reaction of the reactor core can be controlled in a more precise and refined manner. In this embodiment, each control drum 32 is a cylinder and extends in the up-down direction, and an axis of each control drum 32 serves as a rotation center of each control drum 32.

In order to rotate each control drum 32 conveniently, the control drum assembly 3 in this embodiment further includes a plurality of connecting rods 31 fixedly connected to the top of the control drums 32 in one-to-one correspondence, and each connecting rod 31 is in a shape of a long rod. The top of each connecting rod 31 passes through the cover body 11 of the reactor container 1. Each control drum 32 can be controlled simply by rotating each connecting rod 32 to pass through the cover body 11 upward.

In this embodiment, the hot channel 4 is arranged above the reactor core 2, the bottom of the hot channel 4 is hermetically connected to the control drum assembly 3, and the top of the hot channel 4 is hermetically connected to the cover body 11; and a hot pool passage 43 for the coolant to pass through is formed in the hot channel 4. In this embodiment, the hot channel 4 includes a tapered segment 41 and a cylindrical segment 42. The tapered segment 41 is a segment of conical tube, and has a large port and a small port arranged opposite to each other. The cylindrical segment 42 is a segment of circular tube. The large port of the tapered segment 41 faces downward and is hermetically connected to the control drum assembly 3, the small port of the tapered segment 41 faces upward and is hermetically connected to the bottom of the cylindrical segment 42, and the top of the cylindrical segment 42 is hermetically connected to the cover body 11.

In this embodiment, the heat exchanger 5 is arranged in the reactor container 1, and the heat exchanger 5 is located above the reactor core 2 and on the outer periphery of the hot channel 4. The heat exchanger 5 includes a heat exchange container 52 and a heat exchange tube 51. A part of the heat exchange tube 51 is located inside the heat exchange container 52, and two ends of the heat exchange tube 51 hermetically pass out of the heat exchange container 52. A heat exchange medium, which is steam, is introduced into the heat exchange tube 51. In this embodiment, the heat exchanger 52 is provided with a container inlet 53 and a container outlet 54; an inlet of the heat exchanger 5 refers to the container inlet 53 formed in the heat exchange container 52 and in communication with the hot pool passage 43; and the coolant in the hot pool passage 43 can directly flow into the heat exchange container 52. An outlet of the heat exchanger 52 refers to the container outlet 54 formed in the heat exchange container 52, and the container outlet 54 allows the coolant to flow out from the heat exchange container 52.

In this embodiment, there are a plurality of heat exchangers 5 arranged at intervals along the peripheral direction of the hot channel 4, and an inlet of each of the plurality of heat exchangers 5 is in communication with the hot pool passage 43. In this embodiment, a connecting tube is arranged between the hot channel 4 and each of the heat exchange containers 52; one end of each connecting tube is in communication with the hot pool passage 43 in the hot channel 4, and the other end of the connecting tube is in communication with an inner cavity of the heat exchange container 52; and the coolant in the hot pool passage 43 flows into the heat exchange container 52 via the connecting tube.

As shown in FIG. 2, in order to install the plurality of heat exchangers 5 conveniently, the nuclear reactor in this embodiment further includes two connectors 9. The two connectors 9 are both annular, in which one connector 9 has a smaller diameter, and the other connector 9 has a larger diameter. In this embodiment, an inner side of each of the plurality of heat exchangers 5 is fixedly connected to the connector 9 having the smaller diameter, and an outer side of each of the plurality of heat exchangers 5 is fixedly connected to the connector 9 having the larger diameter. The two connectors 9 are both arranged between the cover body 11 and the heat exchangers 5. The bottom of each of the two connectors 9 is welded to the heat exchangers 5, and the top of each of the two connectors 9 is welded to the cover body 11. It can be understood that in some other embodiments, the connectors 9 may be fixedly connected to the heat exchangers 5 and the cover body 11 by bolts; the heat exchangers 5 may also be directly fixed to the cover body 11 by welding, in which case no connector 9 is provided; and the heat exchanger 5 may also be fixedly connected to the cover body 11 directly by means of bolts.

In this embodiment, the sealing sleeve 7 is arranged in the reactor container 1, and the sealing sleeve 7 is located above the reactor core 2 and on the outer peripheral side of the hot channel 4. The bottom end of the sealing sleeve 7 is hermetically connected to the top of the control drum assembly 3, and the top end of the sealing sleeve 7 is hermetically connected to the cover body 11. A sealed annular cavity 71 is formed between the sealing sleeve 7 and the hot channel 4, and each heat exchanger 5 is arranged in the annular cavity 71. A cold pool passage 12 is formed between the sealing sleeve 7 and the reactor container 1, and is used for the coolant to circulate. In this embodiment, the container outlet 54 (the outlet of the heat exchanger 5) is arranged at the bottom of the heat exchange container 52, and the coolant flowing out from the container outlet 54 directly flows into the annular cavity 71. A through hole 72 is formed in the sealing sleeve 7 and used to communicate the annular cavity 71 with the cold pool passage 12, and the coolant in the annular cavity 71 can flow into the cold pool passage 12 via the through hole 72.

In order to improve the heat exchange efficiency of the coolant in the heat exchanger 5, the container inlet 53 of each heat exchanger 5 in this embodiment is formed at the top of the heat exchange container 52, the container outlet 54 of each heat exchanger 5 is formed at the bottom of the heat exchange container 52, and the coolant flowing into each heat exchange container 52 flows in a direction from top to bottom. In this embodiment, the heat exchange tube 51 of each heat exchanger 5 first extends vertically to the bottom of the heat exchange container 52, and then spirals upward from the bottom of the heat exchange container 52. That is, the heat exchange medium in each heat exchange tube 51 can be regarded as flowing in a direction from bottom to top, and this reverse heat exchange method improves the thermal efficiency.

In this embodiment, the annular cavity 71 has a first gas space 711 at the top thereof, and the first gas space 711 is filled with inert gas. In this embodiment, the through hole 72 in the sealing sleeve 7 is formed at the top of the sealing sleeve 7 and located below the first gas space 711, and the container outlet 54 is located below the through hole 72. The coolant flowing out from the container outlet 54 flows upward and finally flows into the cold pool passage 12 from the through hole 72. In this embodiment, a plurality of through holes 72 are formed in the sealing sleeve 7 and arranged at intervals along a peripheral direction of the sealing sleeve 7, and each through hole 72 communicates the annular cavity 7 with the cold pool passage 12.

In this embodiment, the cold pool passage 12 has a second gas space 121 at the top thereof, and the second gas space 121 is filled with an inert gas. In this embodiment, the first gas space 711 and the second gas space 121 are both annular, and both have the functions of converging the heat exchange medium and buffering the pressure impact caused by flash vaporization or flash explosion.

The main pump 6 in this embodiment is a short-shaft pump and includes a motor 61 and an impeller 62 arranged on an output shaft of the motor 61, and the impeller 62 is driven by the motor 61 to rotate. In this embodiment, the output shaft of the motor 61 is arranged on and passes through the cover body 11; the impeller 62 is arranged inside the hot pool passage 43, and the rotating impeller 62 transfers the coolant in the hot pool passage 43 outwards, driving the coolant in the hot pool passage 43 to flow into the heat exchanger 5. In this embodiment, the motor 61 of the main pump 6 is fixedly connected to the cover body 11 directly by welding, bolt connection, or the like.

In this embodiment, when the nuclear reactor is installed and fixed, the assembled nuclear reactor is inserted into a through hole of a mounting frame (i.e., the preset member), and the cover body 11 of the reactor container 1 stops against an edge of the through hole of the mounting frame, such that the nuclear reactor is suspended from the mounting frame. Finally, the cover body 11 of the reactor container 1 and the mounting frame can be installed and fixed.

Figure 4:
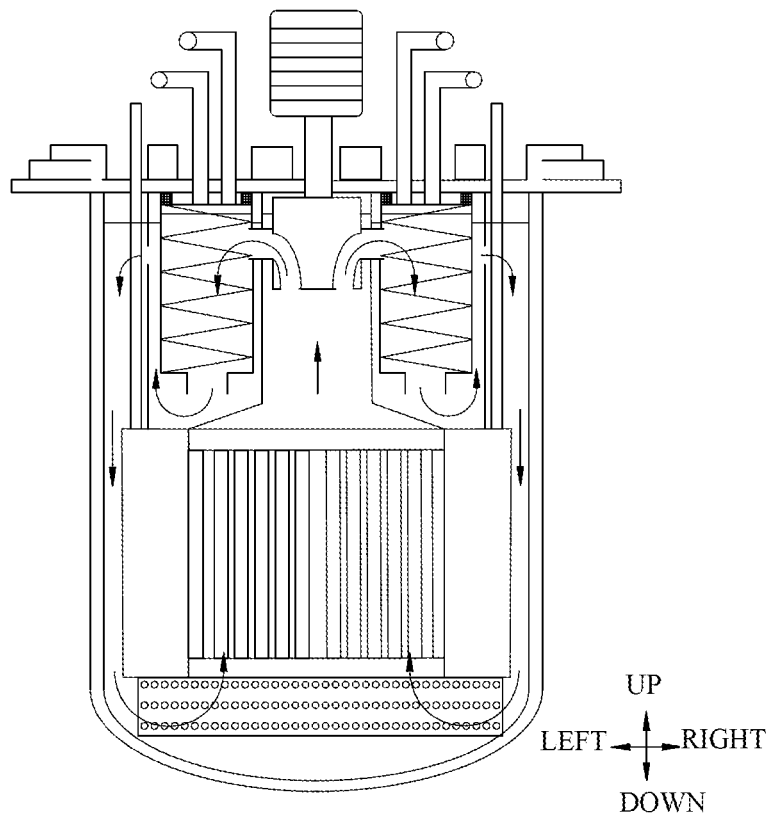
FIG. 4 is a schematic diagram illustrating a flow direction of a coolant inside the nuclear reactor in FIG. 1.

As shown in FIG. 4, when the nuclear reactor in this embodiment is operating, the nuclear reaction is carried out in the reactor core 2. By rotating each control drum 32 in the control drum assembly 3, the nuclear reaction in the reactor core 2 can be controlled. The coolant in the cold pool passage 12 flows into the reactor core 2 via the guide plate 8 to cool the reactor core 2. The coolant flowing out from the top of the reactor core 2 enters the hot pool passage 43 of the hot channel 4, and under the drive of the main pump 6, the hotter coolant in the hot channel 4 flows into the corresponding heat exchangers 5 via the respective connecting tubes. After exchanging heat in each heat exchanger 5, the coolant with a lower temperature flows out from the outlet at the bottom of each heat exchanger 5 and enters the annular cavity 71. Then, the coolant flows upward along the annular cavity 71 and flows into the cold pool passage 12 from each through hole 72, thereby completing a cooling cycle of the coolant.

The nuclear reactor according to another example of the present disclosure will be described below with reference to FIG. 6 and FIG. 7.

The nuclear reactor according to the present disclosure includes a reactor container 1, a reactor core 2, a control drum assembly 3, a hot channel 4, a heat exchanger 5, a sealing sleeve 7, a guide plate 8 and a main pump 6, all of which may be the same as those in the above embodiments, and will not be repeated here. The difference is that, as shown in FIG. 6 and FIG. 7, the heat exchanger 5 in this embodiment is an annular heat exchanger 5 and includes a heat exchange container 52 and a heat exchange tubes 51; the heat exchange container 52 is annular and fitted over the outer periphery of the hot channel 4; and the heat exchange tube 51 located in the heat exchange container 52 is coiled around the outer periphery of the hot channel 4. In order to ensure the stable operation, a plurality of heat exchange tubes 51 through which the heat exchange medium is independently introduced are arranged in the heat exchange container 52, and each heat exchange tube 51 is spirally coiled around the outer periphery of the heat channel 4. In this embodiment, a plurality of connecting tubes may be arranged between the heat exchange container 52 and the hot channel 4, and the connecting tubes are arranged at equal intervals along the peripheral direction. A plurality of container outlets 54 may also be formed at the bottom of the heat exchange container 52, and the container outlets 54 are arranged at equal intervals along the peripheral direction.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience and simplicity of description and do not indicate or imply that referred devices or elements must have particular orientations or be constructed and operated in particular orientations. Thus, these terms cannot be construed as limiting the present disclosure.

Moreover, terms such as "first" and "second" are only for the purpose of description and are not intended to indicate or imply relative importance or the number of technical features indicated. Thus, the features defined by the terms "first" and "second" may include one or more of the features either explicitly or implicitly. In the description of the present disclosure, the term "a plurality of" means at least two, such as two, three, etc., unless otherwise specifically limited.

In the present disclosure, unless otherwise specified and limited, the terms "mounted," "connected," "coupled," "fixed" and the like should be broadly understood, and may be, for example, fixed connection, detachable connection, or integrated connection; may also be mechanical or electrical connection or mutual communication; may also be direct connection, or indirect connection via intervening structures, or inner communication of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, a person skilled in the art can integrate and combine different embodiments or examples as well features in different embodiments or examples described in this specification.

Although explanatory embodiments of the present disclosure have been shown and described above, it can be understood that the above embodiments are exemplary and should not be construed as limiting the present disclosure. A person of ordinary skill in the art can make changes, modifications, alternatives and variations to the above embodiments within the scope of the present disclosure.

What is claimed is:

1. A nuclear reactor, comprising:
   a reactor container comprising a barrel body and a cover body, wherein an opening is formed at a top of the barrel body, the cover body seals the opening of the barrel body, and the reactor container contains a coolant;
   a reactor core arranged at a lower middle part inside the reactor container, the coolant being configured to cool the reactor core;
   a control drum assembly surrounding the reactor core, wherein the control drum assembly comprises a plurality of control drums, each of the control drums is rotatable around its center, and the plurality of control drums are arranged at intervals around the reactor core;
   a coolant channel arranged in the reactor container and entirely located above the reactor core, wherein the coolant channel has a bottom hermetically and directly connected to a top of the control drum assembly and a top hermetically connected to the cover body, the coolant channel has a first coolant passage for the coolant to pass through, wherein the cover body forms the inner top surface of the reactor container, and wherein the coolant flows from the reactor core, where it is heated, into the first coolant passage;
   a heat exchanger arranged in the reactor container on an outer periphery of the coolant channel and entirely located above the reactor core, the heat exchanger surrounding the coolant channel, wherein an inlet of the heat exchanger is in communication with the first coolant passage, and a top of the heat exchanger is fixedly connected to the cover body;
   a main pump fixed on the cover body wherein the main pump pumps the coolant in the first coolant passage into the heat exchanger, wherein the main pump includes a motor and an impeller, wherein the impeller is arranged on an output shaft of the motor and inside the first coolant passage of the coolant channel such that rotation of the impeller transfers coolant outward from the first coolant passage into the heat exchanger; and
   a sealing sleeve arranged in the reactor container on the outer periphery of the coolant channel and located entirely above the reactor core.

2. The nuclear reactor according to claim 1, wherein the sealing sleeve is spaced apart from the reactor container in a radial direction of the reactor container to form a second coolant passage,
   wherein: the sealing sleeve has a bottom hermetically connected to the control drum assembly and a top hermetically connected to the inner top surface of the reactor container; the sealing sleeve surrounds the coolant channel and is spaced apart from the coolant channel in the radial direction of the reactor container to form an annular cavity; the annular cavity has a first gas space at a top of the annular cavity, and inert gas is filled in the first gas space; the heat exchanger is arranged in the annular cavity; a through hole is formed at the top of the sealing sleeve and located below the first gas space, and the through hole is in communication with the annular cavity and the second coolant passage; and an outlet of the heat exchanger is formed at a bottom of the heat exchanger; and
   the coolant, whose temperature becomes lower after heat exchange within the heat exchanger, flows into the second coolant passage.

3. The nuclear reactor according to claim 2, wherein the second coolant passage has a gas space, which is a second gas space in the nuclear reactor, at a top of the second coolant passage, and inert gas is filled in the second gas space.

4. The nuclear reactor according to claim 2, wherein there are a plurality of through holes arranged at intervals around the sealing sleeve, and the plurality of through holes comprise the through hole.

5. The nuclear reactor according to claim 2, further comprising a guide plate arranged below the reactor core, the guide plate guiding the coolant in the second coolant passage to flow into the reactor core.

6. The nuclear reactor according to claim 1, wherein the coolant channel comprises a tapered segment and a cylindrical segment, wherein a cross-sectional area of the tapered segment gradually increases from top to bottom, and the tapered segment has a lower end hermetically connected to the control drum assembly and an upper end connected to the cylindrical segment; and a cross-sectional area of the cylindrical segment is constant from top to bottom.

7. The nuclear reactor according to claim 1, wherein the control drum assembly further comprises a plurality of connecting rods connected to the control drums in one-toone correspondence; and the plurality of connecting rods pass through the reactor container and drive the control drums to rotate to control a nuclear reaction of the reactor core.

8. The nuclear reactor according to claim 1, wherein there are a plurality of heat exchangers arranged at intervals around the coolant channel, the plurality of heat exchangers comprise the heat exchanger; and an inlet of each of the plurality of heat exchangers is in communication with the first coolant passage.

9. The nuclear reactor according to claim 1, wherein the heat exchanger comprises a heat exchange container and a heat exchange tube partially arranged in the heat exchange container, the heat exchange container is annular and arranged around the coolant channel, and the heat exchange tube located inside the heat exchange container is coiled around the coolant channel.

10. The nuclear reactor according to claim 1, further comprising a connector arranged in the reactor container and located between the heat exchanger and the cover body, wherein the connector has a first end fixedly connected to the heat exchanger and a second end fixedly connected to the cover body, and the heat exchanger and the cover body are connected via the connector.

* * * * *